United States Patent
Lundgren

(10) Patent No.: US 11,578,674 B2
(45) Date of Patent: Feb. 14, 2023

(54) INTERNAL COMBUSTION ENGINE ARRANGEMENT AND METHOD OF CONTROLLING OPERATION THEREOF

(71) Applicant: VOLVO TRUCK CORPORATION, Gothenburg (SE)

(72) Inventor: Staffan Lundgren, Hindås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 44 days.

(21) Appl. No.: 17/050,743

(22) PCT Filed: Apr. 25, 2018

(86) PCT No.: PCT/EP2018/060616
§ 371 (c)(1),
(2) Date: Oct. 26, 2020

(87) PCT Pub. No.: WO2019/206410
PCT Pub. Date: Oct. 31, 2019

(65) Prior Publication Data
US 2021/0231062 A1 Jul. 29, 2021

(51) Int. Cl.
*F02D 19/08* (2006.01)
*F02D 41/06* (2006.01)
*F02D 41/30* (2006.01)

(52) U.S. Cl.
CPC ........... *F02D 19/081* (2013.01); *F02D 41/06* (2013.01); *F02D 41/30* (2013.01); *F02D 2200/1002* (2013.01)

(58) Field of Classification Search
CPC .. F02D 19/0642; F02D 19/0649; F02D 19/08; F02D 19/081; F02D 19/105;
(Continued)

(56) References Cited

U.S. PATENT DOCUMENTS 6,230,683 B1 5/2001 zur Loye et al.
7,284,506 B1 * 10/2007 Sun ................... F02D 41/3041
123/304
(Continued)

FOREIGN PATENT DOCUMENTS

CN 1873202 A 12/2006
CN 101922361 A 12/2010
(Continued)

OTHER PUBLICATIONS

International Search Report and Written Opinion dated Jan. 25, 2019 in corresponding International PCT Application No. PCT/EP2018/060616, 10 pages.
(Continued)

*Primary Examiner* — Carl C Staubach
(74) *Attorney, Agent, or Firm* — Venable LLP; Jeffri A Kaminski

(57) ABSTRACT

The invention relates to a method of controlling operation of an ICE arrangement (1), comprising acquiring (100) a first signal indicative of a required torque; acquiring (102) a second signal indicative of a temperature (T) of an EATS (23); and when the second signal indicates that the temperature (T) of the EATS (23) is lower than a predefined first threshold temperature ($T_1$): determining (108; 118) an amount of second fuel (17) needed to deliver the required torque; supplying the amount of second fuel (17); controlling (112; 122) an inlet valve (19) to allow flow of a second fuel-air mix into the cylinder (3); injecting first fuel (13) into the cylinder (3) when the second fuel-air mix is compressed by the piston (9), resulting in flame propagation ignition of the second fuel-air mix; and controlling (116; 126) and outlet valve (21) to allow flow of exhaust from the cylinder (3) during an exhaust stroke (ES) of the piston (9).

19 Claims, 4 Drawing Sheets

(58) Field of Classification Search
CPC ....... F02D 2041/001; F02D 2200/0802; F02D 2200/1002; F02D 41/0025; F02D 41/024; F02D 41/0255; F02D 41/06; F02D 41/068; F02D 41/30; F02D 41/3047; F02D 41/3076; F02D 41/3094

See application file for complete search history.

(56) References Cited

U.S. PATENT DOCUMENTS

| | | | | |
|---|---|---|---|---|
| 7,661,414 | B2* | 2/2010 | Kamio | F02M 25/0224 |
| | | | | 123/3 |
| 7,905,206 | B2* | 3/2011 | Willi | F02D 13/02 |
| | | | | 123/90.15 |
| 7,913,673 | B2 | 3/2011 | Vanderslice et al. | |
| 7,958,720 | B2* | 6/2011 | Okamoto | F02D 37/02 |
| | | | | 60/299 |
| 9,255,551 | B2* | 2/2016 | Choi | F02D 41/0065 |
| 9,932,912 | B2* | 4/2018 | Walker | F02D 19/0692 |
| 2002/0078918 | A1* | 6/2002 | Ancimer | F02B 7/08 |
| | | | | 123/304 |
| 2004/0118557 | A1* | 6/2004 | Ancimer | F02B 23/0672 |
| | | | | 166/227 |
| 2006/0207241 | A1 | 9/2006 | Araki et al. | |
| 2009/0125209 | A1* | 5/2009 | Roberts, Jr. | F02D 15/00 |
| | | | | 701/103 |
| 2009/0277434 | A1 | 11/2009 | Surnilla | |
| 2010/0318284 | A1* | 12/2010 | Surnilla | F02P 5/1506 |
| | | | | 123/527 |
| 2011/0088654 | A1 | 4/2011 | Courtoy et al. | |
| 2012/0138033 | A1 | 6/2012 | Kurtz et al. | |
| 2014/0032084 | A1 | 1/2014 | Gehrke et al. | |
| 2015/0040876 | A1* | 2/2015 | Cleeves | F02D 15/00 |
| | | | | 123/90.15 |
| 2017/0022882 | A1 | 1/2017 | Sturman | |
| 2021/0156318 | A1* | 5/2021 | Hamamoto | F02D 41/3064 |

FOREIGN PATENT DOCUMENTS

| | | |
|---|---|---|
| CN | 105593496 A | 5/2016 |
| EP | 1460250 A1 | 9/2004 |
| GB | 201210431 | 7/2012 |
| GB | 2502995 A | 12/2013 |
| WO | 2013182992 A1 | 12/2013 |
| WO | 2015013696 A1 | 1/2015 |

OTHER PUBLICATIONS

Liu, J et al.; Effects of Pilot Injection Strategy on Combustion and Emission Characteristics in Gasoline Compression Ignition, ScienceDirect, Aug. 24-27, 2017; DOI: 10.1016/j.egypro.2017.12.484; pp. 1267-1273; entire document.

International Preliminary Report on Patentability dated Sep. 17, 2020 in corresponding International PCT Application No. PCT/EP2018/060616, 25 pages.

Chinese Office Action dated Mar. 18, 2022 in corresponding Chinese Patent Application No. 201880092655.2, 12 pages.

* cited by examiner

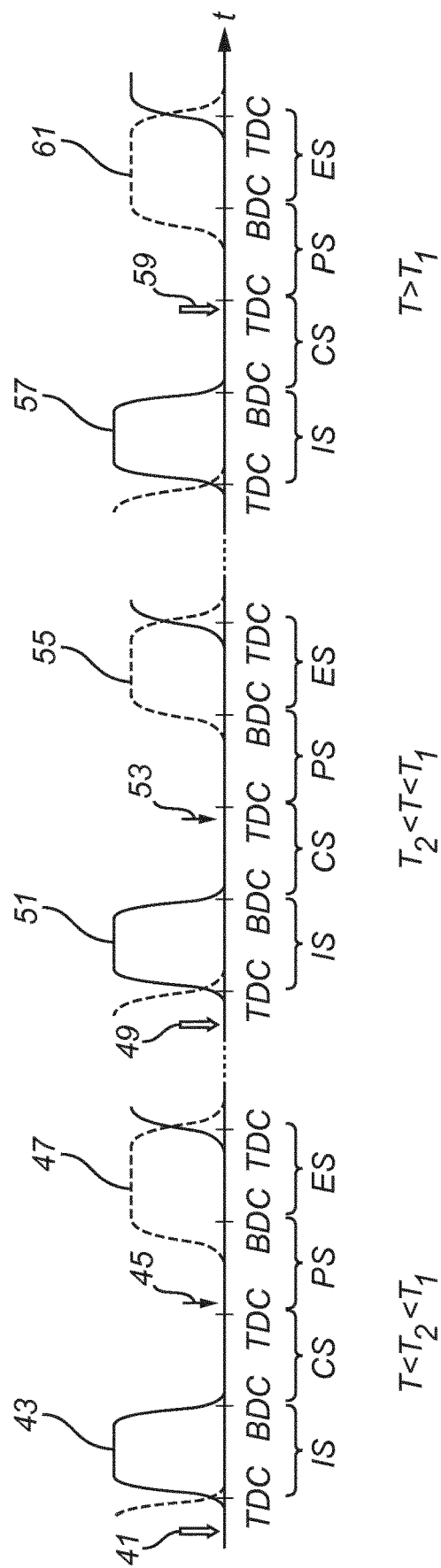

INTERNAL COMBUSTION ENGINE ARRANGEMENT AND METHOD OF CONTROLLING OPERATION THEREOF

CROSS-REFERENCE TO RELATED APPLICATIONS

This application is a U.S. National Stage application of PCT/EP2018/060616, filed Apr. 25, 2018, and published on Oct. 31, 2019, as WO 2019/206410 A1, all of which is hereby incorporated by reference in its entirety.

TECHNICAL FIELD

The invention relates to an internal combustion engine arrangement, and to a method of controlling operation thereof.

The invention can be applied in heavy-duty vehicles, such as trucks, buses and construction equipment. Although the invention will be described with respect to a truck, the invention is not restricted to this particular vehicle, but may also be used in other vehicles such as a passenger car, bus, or working machines, such as wheel loaders or excavators etc.

BACKGROUND

The attraction of diesel engines for heavy vehicles, due to the high efficiency and higher torque at low speeds presented by diesel engines, is well known. As emission control requirements on heavy vehicle diesel engines get stricter with time, efforts have been made to reduce emissions. Such efforts have generally been successful, at least during normal operation of the engine, through the provision of sophisticated exhaust after treatment systems (EATS), which may for example include a so-called diesel oxidation catalyst (DOC), a diesel particulate filter (DPF), and a selective catalyst reduction (SCR) stage etc.

For optimal performance, the EATS should operate at an elevated temperature, at which a catalytic converter comprised in the EATS has reached so-called light-off, where the catalytic converter achieves at least 50% conversion of, for example, nitrous oxides. Depending on the particular configuration of the EATS, the above-mentioned elevated temperature may be as high as 200° C. or higher. To reduce emissions in connection with engine start, it would therefore be desirable to reduce the time needed to heat the EATS to its optimal operating temperature.

SUMMARY

An object of the invention is to provide for reduced emissions from an internal combustion engine arrangement.

According to a first aspect of the invention, this object is achieved by a method of controlling operation of an internal combustion engine arrangement including: a cylinder having an inlet and an outlet; a piston linearly movable in the cylinder; a controllable first fuel supply member for supplying a first fuel to the cylinder; a controllable second fuel supply member for supplying a second fuel, different from the first fuel; an inlet valve for controlling fluid flow into the cylinder through the inlet of the cylinder; an outlet valve for controlling fluid flow from the cylinder through the outlet of the cylinder; and an exhaust after treatment system in fluid flow connection with the outlet of the cylinder to receive exhaust from the cylinder, the exhaust after treatment system comprising a catalytic converter, wherein the method comprises the steps of: before the catalytic converter has reached light-off: controlling the second fuel supply member to supply second fuel; controlling the inlet valve to allow flow of a second fuel-air mix through the inlet into the cylinder during an intake stroke of the piston; controlling the first fuel supply member to inject first fuel into the cylinder when the second fuel-air mix is compressed by the piston, resulting in flame propagation ignition of the second fuel-air mix; and controlling the outlet valve to allow flow of exhaust from the cylinder during an exhaust stroke of the piston; and after the catalytic converter has reached light-off: controlling the second fuel supply member to prevent supply of the second fuel; controlling the inlet valve to allow flow of air through the inlet into the cylinder during the intake stroke of the piston; controlling the first fuel supply member to inject the first fuel into the cylinder when the air is compressed by the piston; and controlling the outlet valve to allow flow of exhaust from the cylinder during the exhaust stroke of the piston.

The piston may be linearly movable in the cylinder for turning a cam shaft. The ICE arrangement may comprise a plurality of cylinders, such as four, six or eight cylinders. There may advantageously be additional inlet valves and outlet valves. Furthermore, the ICE arrangement may advantageously include a valve control arrangement for controlling operation of the inlet valve and the outlet valve. Such valve control arrangement may suitably be a cam-phaser control, or a cam-less valve control arrangement, which may control valve movement using, for example, pressurized air, and/or hydraulics, and/or electrical actuation.

The injection of first fuel into the cylinder when the second fuel-air mix is compressed by the piston may be referred to as a pilot injection of first fuel. In the pilot injection, a very small amount of first fuel is injected, since the purpose of the injection is to ignite the second fuel-air mix, which delivers the required torque.

The first fuel may advantageously be a high cetane fuel suitable for diffusion combustion, such as diesel, or dimethyl ether (DME), or naphtha, and the second fuel may advantageously be a high octane fuel suitable for flame propagation combustion, such as gasoline, or ethanol, or methanol, or methane etc.

The present invention is based on the realization that reduced emissions in combination with efficient operation of an internal combustion engine (ICE) can be achieved by providing an internal combustion engine (ICE) arrangement that is selectively operable to provide a required torque through diffusion combustion of a first fuel, or flame propagation combustion of a second fuel, and control the ICE arrangement to provide the presently required torque through flame propagation combustion of the second fuel before (at a lower temperature than) the EATS is capable of efficiently treating the exhaust from the cylinder. For instance, the catalytic converter (or one or more of a plurality of catalytic converters) comprised in the EATS has reached light-off, and to provide the presently required torque through diffusion combustion of the first fuel after the catalytic converter in the EATS has reached light-off.

The flame propagation combustion of the second fuel can relatively easily be controlled to provide very hot exhaust, so that the EATS can be heated very rapidly. In this manner, a faster increase in the temperature of the catalytic converter can be achieved, which reduces the time for the catalytic converter to reach light-off. This provides for reduced emission from the ICE, in particular in connection with a cold start. Furthermore, embodiments of the present invention provide for reduced emission from the ICE before the catalytic converter has reached light-off, which provides for further reduced emission from the ICE in connection with a cold start.

Before the catalytic converter has reached light-off, at least one of the inlet valve and the outlet valve may advantageously be controlled to achieve a compression ratio adapted to the second fuel, and after the catalytic converter has reached light-off, the second fuel supply member may be controlled to prevent supply of the second fuel, the first fuel supply member may be controlled to inject an amount of first fuel needed to deliver the required torque, and at least one of the inlet valve and the outlet valve may be controlled to achieve a compression ratio adapted to the first fuel.

According to embodiments, the method may further comprise the steps of acquiring at least one signal indicative of a temperature of the catalytic converter; and determining whether or not the catalytic converter has reached light-off based on the at least one signal indicative of the temperature of the catalytic converter.

The temperature of the catalyst surface(s) of the catalytic converter needed to achieve light-off may vary depending on type and configuration of the catalytic converter. In any case, it is straight-forward to those skilled in the art to determine the temperature needed to achieve light-off for a given catalytic converter.

The above-mentioned at least one signal indicative of the temperature of the catalytic converter may be one or several signals directly indicating the temperature, or one or several signals that indicate the temperature indirectly. In the first case, the vehicle may comprise one or several temperature sensors arranged to measure the temperature of the catalytic converter and/or of the exhaust upstream and/or downstream of the catalytic converter. In the second case, the one or several signals may indicate values of various parameters, such as the engine speed (revolutions per unit time), and/or the engine load, and/or the ambient temperature, and/or the atmospheric pressure. By inputting one or several of such parameter values in a vehicle model (which may simply be one or several look up tables resulting from previously performed vehicle mapping), an indication of the temperature of the catalytic converter can be obtained.

As an alternative to measuring the temperature of the catalytic converter (directly or indirectly as described above), the ICE arrangement may be controlled to provide the presently required torque through flame propagation combustion of the second fuel for a given time period after a cold start, wherein the time period is selected to be sufficiently long to ensure that the catalytic converter has reached light-off after the time period. Thereafter, the ICE arrangement may be controlled to provide the presently required torque through diffusion combustion of the first fuel.

When the at least one signal indicative of the temperature of the catalytic converter indicates that the temperature of the catalytic converter is lower than a predefined second threshold temperature, the second threshold temperature being lower than the first threshold temperature, the outlet valve may be controlled to allow flow of exhaust from the cylinder during a first outlet period; and when the at least one signal indicative of the temperature of the catalytic converter indicates that the temperature of the catalytic converter is higher than the second threshold temperature and lower than the first threshold temperature, the outlet valve may be controlled to allow flow of exhaust from the cylinder during a second outlet period. The first outlet period may start earlier than the second outlet period in relation to a top dead center time (TDC) for the piston.

Accordingly, when the at least one signal indicative of the temperature of the catalytic converter indicates that the catalytic converter is very cold, such as in the initial stage of a cold start, the outlet valve(s) may be controlled to open early, to further increase the temperature of the exhaust to the EATS.

When the at least one signal indicative of the temperature of the catalytic converter indicates that the temperature of the catalytic is lower than a predefined second threshold temperature, the second threshold temperature being lower than the first threshold temperature, the first fuel supply member may be controlled to inject first fuel into the cylinder during a first injection period; and when the at least one signal indicative of the temperature of the catalytic converter indicates that the temperature of the catalytic converter is higher than the second threshold temperature and lower than the first threshold temperature, the first fuel supply member may be controlled to inject first fuel into the cylinder during a second injection period. The first injection period may start later than the second injection period in relation to a top dead center time (TDC) for the piston. Accordingly, when the at least one signal indicative of the temperature of the catalytic converter indicates that the catalytic converter is very cold, such as in the initial stage of a cold start, the pilot injection of first fuel may be delayed, to further increase the temperature of the exhaust to the EATS.

According to embodiments, the ICE arrangement may further comprise a sensor for monitoring an oxygen content in the exhaust from the cylinder; and the method may further comprise the steps of, before the catalytic converter has reached light-off, acquiring, from the sensor, at least one signal indicative of the oxygen content; and controlling, based on the at least one signal indicative of the oxygen content, at least one of the second fuel supply member, the inlet valve, and the outlet valve to achieve stoichiometric combustion of the second fuel-air mix in the cylinder. The sensor for monitoring the oxygen content may, for example, be a lambda probe or a NOx sensor.

According to a second aspect of the invention, this object is achieved by a computer program according to claim 10.

According to a third aspect of the invention, this object is achieved by a computer readable medium according to claim 11.

According to a fourth aspect of the invention, this object is achieved by a control unit according to claim 12.

According to a fifth aspect of the invention, this object is achieved by an internal combustion engine arrangement according to claim 13.

According to embodiments, the EATS may comprise a catalytic converter including a catalyst adapted to promote reduction of nitrogen oxides. For instance, a diesel oxidation catalyst (DOC) may advantageously be modified by the addition of such a catalyst, such as Rh, to improve TWC (three-way catalyst) functionality. When the ICE arrangement is operated to provide the required torque through flame propagation combustion of second fuel-air mix, and controlled to achieve stoichiometric combustion of said second fuel-air mix in said cylinder, NOx in the exhaust can be processed by the above-mentioned catalyst.

In summary, aspects of the present invention thus relate to a method of controlling operation of an ICE arrangement, comprising acquiring a first signal indicative of a required torque; acquiring a second signal indicative of a temperature of an EATS; and when the second signal indicates that the temperature of the EATS is lower than a predefined first threshold temperature: determining an amount of second fuel needed to deliver the required torque; supplying the amount of second fuel; controlling an inlet valve to allow flow of a second fuel-air mix into the cylinder; injecting first fuel into the cylinder when the second fuel-air mix is compressed by the piston, resulting in flame propagation ignition of the second fuel-air mix; and controlling and outlet valve to allow flow of exhaust from the cylinder during an exhaust stroke of the piston.

BRIEF DESCRIPTION OF THE DRAWINGS

With reference to the appended drawings, below follows a more detailed description of embodiments of the invention cited as examples.

In the drawings:

FIG. 4 is a diagram depicting events in a cylinder of the ICE arrangement in FIG. 2 when carrying out the method in FIG. 3.

DETAILED DESCRIPTION OF EXAMPLE EMBODIMENTS OF THE INVENTION

Figure 1:
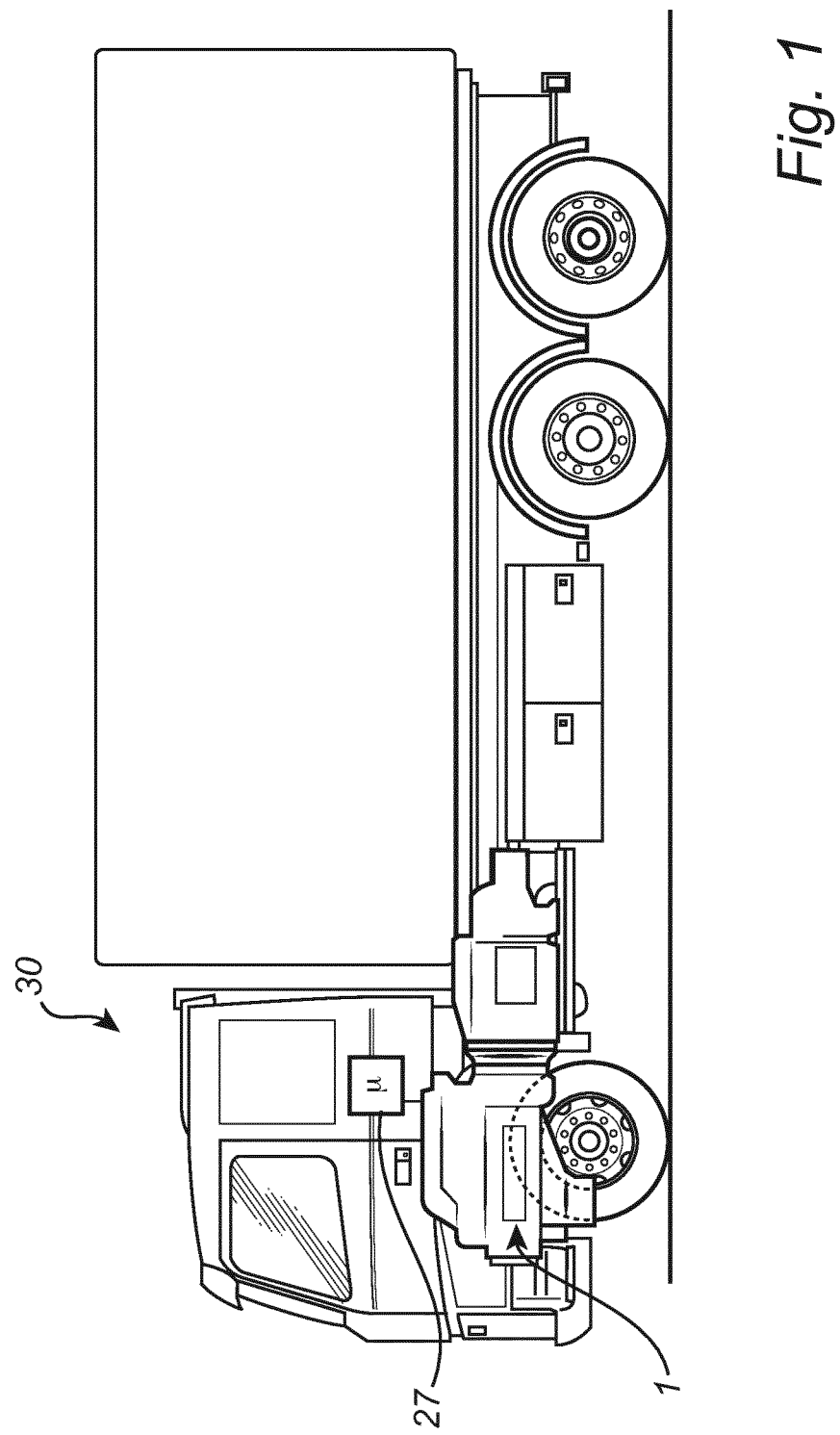
FIG. 1 is a side view of a vehicle according to an embodiment of the present invention, in the form of a truck.

FIG. 1 schematically shows a vehicle, here in the form of a truck 30, including an ICE arrangement 1 according to an example embodiment of the present invention. The ICE arrangement 1 comprises a control unit 27 for controlling operation of the ICE arrangement 1.

Figure 2:
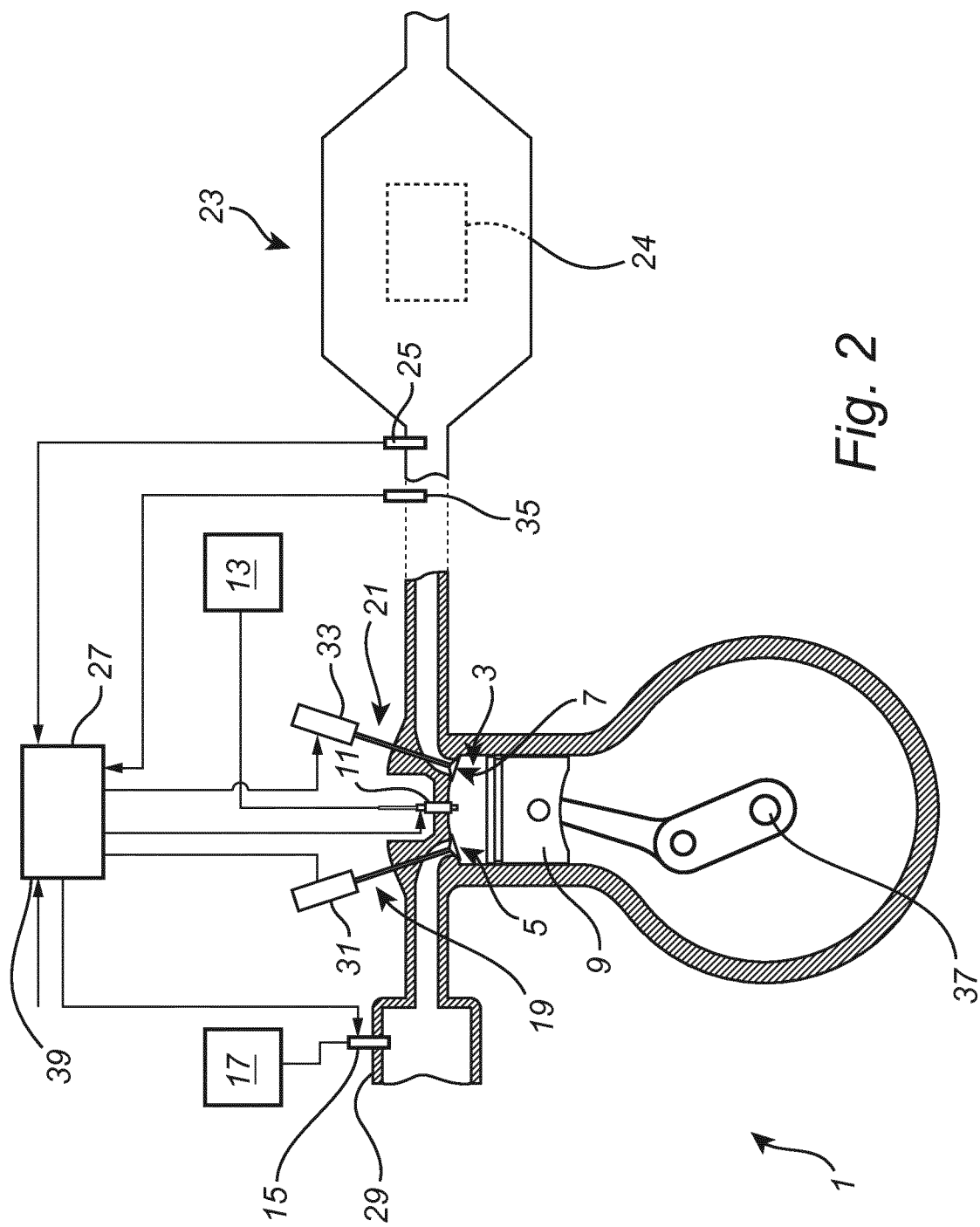
FIG. 2 shows part of an ICE arrangement in the vehicle in FIG. 1.

Referring to FIG. 2, the ICE arrangement 1 comprises a cylinder 3 having an inlet 5 and an outlet 7, a piston 9, a crank shaft 37, a first tank for holding a first fuel 13, a controllable first fuel supply member 11, a second tank for holding a second fuel 17, a controllable second fuel supply member 15, an inlet valve 19, an outlet valve 21, an exhaust after treatment system (EATS) 23, a sensor in the form of a lambda probe 25, a temperature sensor 35, and a control unit 27. The EATS 23 comprises a catalytic converter 24, such as a diesel oxidation catalytic converter (DOC) including a catalyst, such as Rh, adapted to promote reduction of nitrogen oxides.

The first fuel supply member 11 is controllable to supply first fuel 13 to the cylinder 3, and the second fuel supply member 15 is controllable to supply second fuel 17. In FIG. 2, the second fuel supply member 15 is arranged in the inlet manifold 29, and may be a so-called plenum injector. It should, however, be noted that the second fuel supply member 15 may supply second fuel at another suitable location, including directly to the cylinder 3.

The inlet valve 19 is arranged to control fluid flow into the cylinder 3 through the inlet 5, and the outlet valve 21 is arranged to control fluid flow from the cylinder 3 through the outlet 7 of the cylinder 3. The inlet valve 19 is provided with independently controllable valve actuator 31, and the outlet valve 21 is provided with independently controllable valve actuator 33.

The schematically indicated EATS 23 is in fluid flow connection with the outlet 7 of the cylinder to receive and process exhaust from the cylinder, and the lambda probe 25 is arranged upstream of the EATS 23 as is schematically indicated in FIG. 2. The exhaust temperature sensor 35 is also arranged upstream of the EATS 23, to measure the temperature of the exhaust. Based on the exhaust temperature at the inlet of the EATS 23, the temperature of the EATS can be estimated. Alternatively, the temperature of one or several relevant parts of the EATS 23 can be directly measured using one or several temperature sensors not shown in FIG. 2.

As is schematically indicated in FIG. 2, the control unit 27 is connected to the first fuel supply member 11, the second fuel supply member 15, the inlet valve 19, the outlet valve 21, the lambda sensor 25, and the temperature sensor 35. In addition, the control unit 27 has an input 39 for receiving a first signal indicative of a requested torque to be delivered by the ICE arrangement 1. The first signal may, for example, originate from a gas pedal, and/or from drive control system for the vehicle 30.

In the following, the first fuel 13 will be exemplified by diesel, and the second fuel 17 may be exemplified by gasoline.

An example embodiment of the method according to the present invention will now be described with reference to the schematic flow-chart in FIG. 3, and with additional reference to FIG. 2 and FIG. 4.

In a first step 100, the control unit 27 acquires a first signal indicative of a required torque to be delivered by the ICE arrangement 1.

In the subsequent step 102, the control unit 27 acquires a second signal indicative of a temperature T of the EATS 23.

If it is determined, by the control unit 27, in step 104 that the second signal acquired in step 102 indicates that the temperature T of the EATS 23 is lower than a predefined first threshold temperature T1, the method proceeds to step 106.

If it is determined, by the control unit 27, in step 106 that the second signal acquired in step 102 indicates that the temperature T of the EATS 23 is lower than a predefined second threshold temperature T2, lower than the first threshold temperature T1, the control unit 27 controls the ICE arrangement 1 to perform a stroke cycle illustrated in FIG. 4A. In the stroke cycle illustrated in FIG. 4A, the top dead center times are indicated by TDC, and the bottom dead center times are indicated by BDC. Further, the intake stroke, the compression stroke, the power stroke, and the exhaust stroke are represented by IS, CS, PS, and ES, respectively. As is universally known, the stroke cycle is a cyclic process, so that an exhaust stroke is directly followed by the next intake stroke etc. In FIG. 4A, supply of fuel is indicated by arrows, and valve openings are represented by solid lines for the intake valve 19 and dashed lines for the exhaust valve 21. In the stroke cycle in FIG. 4A, it should be understood that at least one of the intake valve 19 and the outlet valve 21 is controlled by the control unit 27 to achieve a compression ratio that is suitable for gasoline, and that the control unit 27 acquires a third signal from the lambda sensor 25, and controls at least one of the second fuel supply member 15, the inlet valve 19 and the outlet valve 21 to achieve stoichiometric combustion of the gasoline-air mix in the cylinder 3.

In this stroke cycle, for low temperature operation, the method proceeds to step 108, where an amount of gasoline 17 needed to deliver the required torque is determined by the control unit 27.

In step 110 the control unit 27 controls the second fuel supply member 15 to supply the determined amount of gasoline 17 to the intake manifold 29 at the gasoline supply event 41 indicated in FIG. 4A.

In the subsequent step 112, the control unit 27 controls the intake valve 19 to open during a first inlet period 43, to allow intake of gasoline-air mix from the intake manifold 29 to the cylinder 3 through the intake 5.

In step 114, the control unit 27 controls the first fuel supply member 11 to inject a pilot amount (a small amount) of diesel into the cylinder 3 during a first injection period 45. In the example stroke cycle in FIG. 4A, the first injection period 45 is indicated to take place just after the top dead center time TDC. Due to the high pressure in the cylinder at the first injection period 45, the pilot amount of diesel will spontaneously combust, and ignite the pressurized gasoline-air mix in the cylinder. The resulting flame propagation combustion of the gasoline-air mix will cause expansion in the cylinder, moving the piston 9 towards its bottom dead center during the power stroke as indicated in FIG. 4A.

When the piston 9 is approaching the bottom dead center, the control unit 27 controls, in step 116, the outlet valve 21 to open during a first outlet period 47 to allow exhaust to be pushed out of the cylinder 3 by the piston 9 through the outlet 7 towards the EATS 23.

This stroke cycle is adapted to provide hot exhaust, to heat the EATS 23 as quickly as possible. In particular this is achieved through the combustion of gasoline-air mix, and further enhanced by a relatively late ignition 45 of the gasoline-air mix, and a relatively early opening 47 of the exhaust valve 21.

Figure 3:
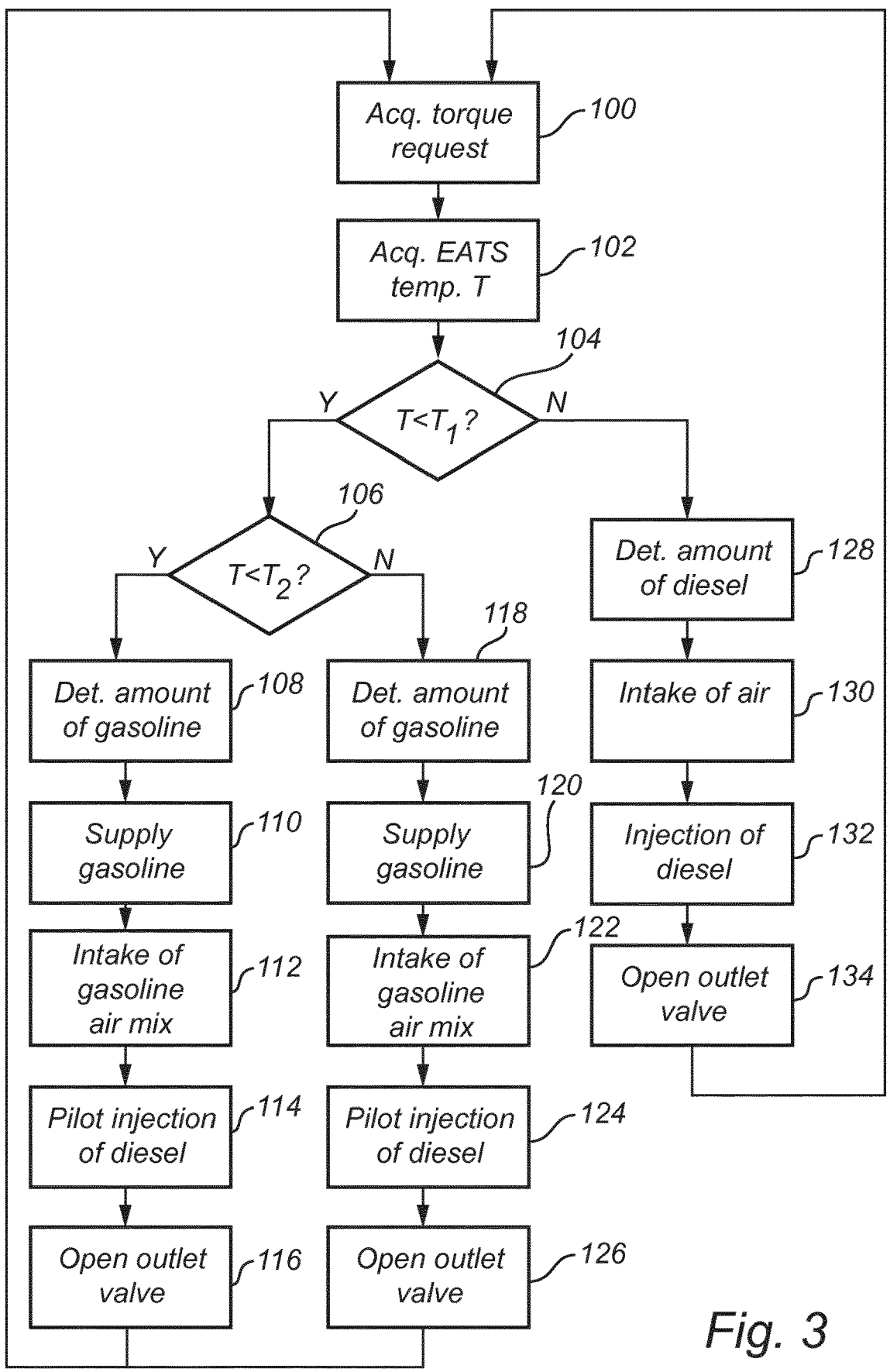
FIG. 3 is a flow-chart schematically illustrating an embodiment of the method according to the present invention.

After step 116, the method returns to step 100, as is indicated in the flow-chart of FIG. 3.

If it is instead determined, by the control unit 27, in step 106 that the second signal acquired in step 102 indicates that the temperature T of the EATS 23 is higher than the predefined second threshold temperature T2, lower than the first threshold temperature T1, the control unit 27 controls the ICE arrangement 1 to perform a stroke cycle illustrated in FIG. 4B.

In this stroke cycle, the method proceeds to step 118, where an amount of gasoline 17 needed to deliver the required torque is determined by the control unit 27.

In step 120 the control unit 27 controls the second fuel supply member 15 to supply the determined amount of gasoline 17 to the intake manifold 29 at the gasoline supply event 49 indicated in FIG. 4B.

In the subsequent step 122, the control unit 27 controls the intake valve 19 to open during a second inlet period 51, to allow intake of gasoline-air mix from the intake manifold 29 to the cylinder 3 through the intake 5.

In step 124, the control unit 27 controls the first fuel supply member 11 to inject a pilot amount (a small amount) of diesel into the cylinder 3 during a second injection period 53. In the example stroke cycle in FIG. 4B, the second injection period 53 is indicated to take place just before the top dead center time TDC. Due to the high pressure in the cylinder at the second injection period 53, the pilot amount of diesel will spontaneously combust, and ignite the pressurized gasoline-air mix in the cylinder. The resulting flame propagation combustion of the gasoline-air mix will cause expansion in the cylinder, moving the piston 9 towards its bottom dead center during the power stroke as indicated in FIG. 4B.

When the piston 9 is approaching the bottom dead center, the control unit 27 controls, in step 126, the outlet valve 21 to open during a second outlet period 55 to allow exhaust to be pushed out of the cylinder 3 by the piston 9 through the outlet 7 towards the EATS 23.

This stroke cycle is adapted to provide hot exhaust, to heat the EATS 23. The exhaust temperature is not quite as high as during the stroke cycle in FIG. 4A, but operation of the ICE arrangement 1 is more efficient, as the ignition 53 is somewhat earlier, and the opening of the exhaust valve 21 is somewhat delayed.

After step 126, the method returns to step 100 as is indicated in the flow-chart of FIG. 3.

If it is instead determined, by the control unit 27, in step 104 that the second signal acquired in step 102 indicates that the temperature T of the EATS 23 is higher than the predefined first threshold temperature T1, the control unit 27 controls the ICE arrangement 1 to perform a stroke cycle illustrated in FIG. 4C.

In this stroke cycle, for normal high-temperature operation, the method proceeds to step 128, where an amount of diesel 13 needed to deliver the required torque is determined by the control unit 27.

In the subsequent step 130, the control unit 27 controls the intake valve 19 to open during a third inlet period 57, to allow intake of air from the intake manifold 29 to the cylinder 3 through the intake 5. The air admitted/pushed into the cylinder 3 is compressed by the piston during the compression stroke CS.

In step 132, the control unit 27 controls the first fuel supply member 11 to inject the determined amount of diesel into the cylinder 3 during a third injection period 59. Due to the high pressure in the cylinder at the third injection period 45, the diesel will spontaneously ignite and undergo diffusion combustion, causing expansion in the cylinder 3. As a result of the expansion, the piston 9 is moved towards its bottom dead center during the power stroke as indicated in FIG. 4C.

When the piston 9 is approaching the bottom dead center, the control unit 27 controls, in step 134, the outlet valve 21 to open during a third outlet period 61 to allow exhaust to be pushed out of the cylinder 3 by the piston 9 through the outlet 7 towards the EATS 23.

Since the EATS 23 has now reached a temperature at which it operates efficiently, the diesel exhaust can be efficiently processed by the EATS 23, resulting in low emissions from the ICE arrangement 1.

After step 134, the method returns to step 100, as is indicated in the flow-chart of FIG. 3.

It is to be understood that the present invention is not limited to the embodiments described above and illustrated in the drawings; rather, the skilled person will recognize that many changes and modifications may be made within the scope of the appended claims.

The invention claimed is:

1. A method of controlling operation of an internal combustion engine arrangement including: a cylinder having an inlet and an outlet; a piston linearly movable in said cylinder; a controllable first fuel supply member for supplying a first fuel, being diesel or dimethyl ether (DME) or naphtha, to said cylinder; a controllable second fuel supply member for supplying a second fuel being gasoline or ethanol or methanol; an inlet valve for controlling fluid flow into said cylinder through the inlet of said cylinder; an outlet valve for controlling fluid flow from said cylinder through the outlet of said cylinder; and an exhaust after treatment system in fluid flow connection with the outlet of said cylinder to receive exhaust from said cylinder, said exhaust after treatment system comprising a catalytic converter, wherein the method comprises the steps of: before said catalytic converter has reached light-off: controlling said second fuel supply member to supply second fuel; controlling said inlet valve to allow flow of a second fuel-air mix through the inlet into said cylinder during an intake stroke of said piston; controlling said first fuel supply member to inject first fuel into said cylinder when said second fuel-air mix is compressed by said piston, resulting in flame propagation ignition of the second fuel-air mix; and controlling said outlet valve to allow flow of exhaust from said cylinder during an exhaust stroke of said piston; and after said catalytic converter has reached light-off: controlling said second fuel supply member to prevent supply of said second fuel; controlling said inlet valve to allow flow of air through the inlet into said cylinder during the intake stroke of said piston; controlling said first fuel supply member to inject said first fuel into said cylinder when said air is compressed by said piston; and controlling said outlet valve to allow flow of exhaust from said cylinder during the exhaust stroke of said piston.

2. The method according to claim 1, further comprising the step of: acquiring a first signal indicative of a required torque to be delivered by said internal combustion engine arrangement, wherein: before said catalytic converter has reached light-off, said second fuel supply member is controlled to supply an amount of second fuel needed to deliver said required torque; and after said catalytic converter has reached light-off, said second fuel supply member is controlled to prevent supply of said second fuel, and said first fuel supply member is controlled to inject an amount of first fuel needed to deliver said required torque.

3. The method according to claim 1, further comprising the steps of: acquiring at least one signal indicative of a temperature of said catalytic converter; and determining whether or not said catalytic converter has reached light-off based on said at least one signal indicative of the temperature of said catalytic converter.

4. The method according to claim 3, wherein it is determined that said catalytic converter has reached light-off when said at least one signal indicates that the temperature of said catalytic converter is higher than a predefined first threshold temperature.

5. The method according to claim 4, wherein: when said at least one signal indicates that the temperature of said catalytic converter is lower than a predefined second threshold temperature, said second threshold temperature being lower than said first threshold temperature, said outlet valve is controlled to allow flow of exhaust from said cylinder during a first outlet period; and when said at least one signal indicates that the temperature of said catalytic converter is higher than said second threshold temperature and lower than said first threshold temperature, said outlet valve is controlled to allow flow of exhaust from said cylinder during a second outlet period, wherein said first outlet period starts earlier than said second outlet period in relation to a top dead center time for said piston.

6. The method according to claim 4, wherein: when said at least one signal indicates that the temperature of said catalytic converter is lower than a predefined second threshold temperature, said second threshold temperature being lower than said first threshold temperature, said first fuel supply member is controlled to inject first fuel into said cylinder during a first injection period; and when said at least one signal indicates that the temperature of said catalytic converter is higher than said second threshold temperature and lower than said first threshold temperature, said first fuel supply member is controlled to inject first fuel into said cylinder during a second injection period, wherein said first injection period starts later than said second injection period in relation to a top dead center time for said piston.

7. The method according to claim 1, further comprising the step of, before said catalytic converter has reached light-off: controlling at least one of the inlet valve and the outlet valve to achieve a compression ratio adapted to said second fuel.

8. The method according to claim 1, wherein: said internal combustion engine arrangement further comprises a sensor for monitoring an oxygen content in the exhaust from said cylinder; and the method further comprises the steps of, before said catalytic converter has reached light-off: acquiring at least one signal indicative of said oxygen content; and controlling, based on said at least one signal indicative of said oxygen content, at least one of the second fuel supply member, the inlet valve, and the outlet valve to achieve stoichiometric combustion of said second fuel-air mix in said cylinder.

9. The method according to claim 1, further comprising the step of, after said catalytic converter has reached light-off: controlling at least one of the inlet valve and the outlet valve to achieve a compression ratio adapted to said first fuel.

10. A computer readable medium carrying a computer program comprising program code means for performing the steps of claim 1 when said program product is run on a computer.

11. A control unit configured to perform the steps of the method according to claim 1.

12. An internal combustion engine arrangement, comprising: a cylinder having an inlet and an outlet; a piston linearly movable in said cylinder; a controllable first fuel supply member for supplying a first fuel, being diesel or dimethyl ether or naphtha, to said cylinder; a controllable second fuel supply member for supplying a second fuel, being gasoline or ethanol or methanol; an inlet valve for controlling fluid flow into said cylinder through the inlet of said cylinder; an outlet valve for controlling fluid flow from said cylinder through the outlet of said cylinder; an exhaust after treatment system in fluid flow connection with the outlet of said cylinder to receive exhaust from said cylinder; and a control unit configured to: acquire a first signal indicative of a required torque to be delivered by said internal combustion engine arrangement; acquire at least one signal indicative of a temperature of said exhaust after treatment system; and when said at least one signal indicates that the temperature of said exhaust after treatment system is lower than a predefined first threshold temperature: determine an amount of second fuel needed to deliver said required torque; control said second fuel supply member to supply said amount of second fuel; control said inlet valve to allow flow of a second fuel-air mix through the inlet into said cylinder during an intake stroke of said piston; control said first fuel supply member to inject first fuel into said cylinder when said second fuel-air mix is compressed by said piston, resulting in flame propagation ignition of the second fuel-air mix; and control said outlet valve to allow flow of exhaust from said cylinder during an exhaust stroke of said piston.

13. The internal combustion engine arrangement 13, wherein: said internal combustion engine arrangement further comprises a sensor for monitoring an oxygen content in the exhaust from said cylinder; and said control unit is further configured to: acquire a signal indicative of said oxygen content; and control, based on said signal indicative of said oxygen content, at least one of the second fuel supply member, the inlet valve, and the outlet valve to achieve stoichiometric combustion of said second fuel-air mix in said cylinder.

14. The internal combustion engine arrangement according to claim 12, wherein said control unit is further configured to, when said at least one signal indicative of the temperature of said exhaust after treatment system indicates that the temperature of said exhaust after treatment system is higher than said first threshold temperature: at least one of the inlet valve and the outlet valve to achieve a compression ratio adapted to said first fuel.

15. The internal combustion engine arrangement according claim 12, wherein said control unit is further configured to: when the at least one signal indicative of the temperature of said exhaust after treatment system indicates that the temperature of said exhaust after treatment system is lower than a predefined second threshold temperature, said second threshold temperature being lower than said first threshold temperature, control said first fuel supply member to inject first fuel into said cylinder during a first injection period; and when the at least one signal indicative of the temperature of said exhaust after treatment system indicates that the temperature of said exhaust after treatment system is higher than said second threshold temperature and lower than said first threshold temperature, control said first fuel supply member to inject first fuel into said cylinder during a second injection period, wherein said first injection period starts later than said second injection period in relation to a top dead center time for said piston.

16. The internal combustion engine arrangement according to claim 12, wherein said exhaust after treatment system comprises a catalytic converter including a catalyst adapted to promote reduction of nitrogen oxides.

17. A vehicle comprising the internal combustion engine arrangement according to claim 12.

18. The internal combustion engine arrangement according to claim 12, wherein said control unit is further configured to: control at least one of the inlet valve and the outlet valve to achieve a compression ratio adapted to said second fuel, when said second signal indicates that the temperature of said exhaust after treatment system is lower than said first threshold temperature.

19. The internal combustion engine arrangement according to claim 12, wherein said control unit is further configured to, when said at least one signal indicative of the temperature of said exhaust after treatment system indicates that the temperature of said exhaust after treatment system is higher than said first threshold temperature: control said second fuel supply member to prevent supply of said second fuel; determine an amount of first fuel needed to deliver said required torque; control said inlet valve to allow flow of air through the inlet into said cylinder during the intake stroke of said piston; control said first fuel supply member to inject said amount of first fuel into said cylinder when said air is compressed by said piston; and control said outlet valve to allow flow of exhaust from said cylinder during the exhaust stroke of said piston.

\* \* \* \* \*